(12) United States Patent
Zhang et al.

(10) Patent No.: US 10,257,846 B2
(45) Date of Patent: Apr. 9, 2019

(54) DATA TRANSMISSION METHOD AND COMMUNICATIONS DEVICE

(71) Applicant: HUAWEI TECHNOLOGIES CO., LTD., Shenzhen, Guangdong (CN)

(72) Inventors: Jinfang Zhang, Shanghai (CN); Wei Zhang, Shanghai (CN); Chenghui Peng, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 204 days.

(21) Appl. No.: 15/261,565

(22) Filed: Sep. 9, 2016

(65) Prior Publication Data

US 2016/0381695 A1 Dec. 29, 2016

Related U.S. Application Data (63) Continuation of application No. PCT/CN2015/073576, filed on Mar. 3, 2015.

(30) Foreign Application Priority Data

Mar. 10, 2014 (WO) ................ PCT/CN2014/073121

(51) Int. Cl.
*H04W 72/12* (2009.01)
*H04L 27/26* (2006.01)
(Continued)

(52) U.S. Cl.
CPC .......... *H04W 72/12* (2013.01); *H04L 5/0005* (2013.01); *H04L 27/2601* (2013.01); *H04W 76/11* (2018.02); *H04W 76/16* (2018.02)

(58) Field of Classification Search
CPC ..... H04W 72/04; H04W 72/12; H04W 76/00; H04W 76/02; H04W 76/11; H04W 76/16;
(Continued)

(56) References Cited

U.S. PATENT DOCUMENTS 6,594,246 B1 * 7/2003 Jorgensen ................ H04L 1/20
370/338
7,230,937 B2 * 6/2007 Chi ....................... H04W 28/24
370/329
(Continued)

FOREIGN PATENT DOCUMENTS

CN          1917411 A    2/2007
CN        101179836 A    5/2008
(Continued)

OTHER PUBLICATIONS

IEEE Std 802.11™-2012,IEEE Standard for Information technology—Telecommunications and information exchange between systems Local and metropolitan area networks—Specific requirements,Part 11: Wireless LAN Medium Access Control (MAC) and Physical Layer (PHY) Specifications, Mar. 29, 2012. total 2793 pages.
(Continued)

*Primary Examiner* — Tri H Phan
(74) *Attorney, Agent, or Firm* — James Harrison (57) ABSTRACT

The present invention relates to a data transmission method and a communications device. The communications device includes: a memory, a processor, and a communications interface. The memory is configured to store mapping information between a data flow identifier and a physical layer transmission technology identifier. The processor is configured to: determine a to-be-scheduled data flow; determine, from the mapping information and according to a data flow identifier of the data flow, a physical layer transmission technology identifier corresponding to the data flow; generate, according to the data flow, a transport block which is corresponding to the physical layer transmission technology identifier; generate wireless communication data by performing processing, according to a physical layer transmission technology corresponding to the physical layer transmission technology identifier, on a transport block
(Continued)

corresponding to the physical layer transmission technology identifier; and send the wireless communication data to a receive end by using the communications interface.

8 Claims, 5 Drawing Sheets

(51) Int. Cl.
*H04L 5/00* (2006.01)
*H04W 76/11* (2018.01)
*H04W 76/16* (2018.01)

(58) Field of Classification Search
CPC ......... H04L 5/00; H04L 5/0005; H04L 27/26; H04L 27/2601; H04B 7/26
See application file for complete search history.

(56) References Cited

U.S. PATENT DOCUMENTS

| | | | | |
|---|---|---|---|---|
| 8,432,794 | B2* | 4/2013 | Terry | H04L 1/0025 370/229 |
| 9,173,228 | B2 | 10/2015 | Linsky et al. | |
| 9,596,058 | B2* | 3/2017 | Terry | H04L 1/1816 |
| 2004/0254974 | A1* | 12/2004 | Khamfallah | H04W 72/04 709/200 |
| 2006/0034331 | A1 | 2/2006 | Rinne et al. | |
| 2007/0153672 | A1 | 7/2007 | Terry et al. | |
| 2011/0044218 | A1 | 2/2011 | Kaur et al. | |
| 2012/0092994 | A1 | 4/2012 | Wang et al. | |
| 2012/0099509 | A1 | 4/2012 | Ai et al. | |
| 2012/0259985 | A1 | 10/2012 | Koskela et al. | |
| 2013/0286842 | A1 | 10/2013 | Nakatsugawa et al. | |
| 2013/0294379 | A1 | 11/2013 | Guo et al. | |
| 2014/0241265 | A1* | 8/2014 | Pragada | H04W 72/06 370/329 |
| 2015/0003429 | A1 | 1/2015 | Terry et al. | |
| 2015/0156663 | A1 | 6/2015 | Wang et al. | |
| 2016/0028518 | A1* | 1/2016 | Zhao | H04L 1/0028 370/330 |
| 2016/0165621 | A1 | 6/2016 | Kaur et al. | |
| 2016/0352466 | A1* | 12/2016 | Sundberg | H04L 5/0048 |
| 2016/0381695 | A1 | 12/2016 | Zhang et al. | |
| 2017/0207893 | A1* | 7/2017 | Meylan | H04L 5/0053 |

FOREIGN PATENT DOCUMENTS

| | | |
|---|---|---|
| CN | 101242345 A | 8/2008 |
| CN | 101379747 A | 3/2009 |
| CN | 101510791 A | 8/2009 |
| CN | 101577694 A | 11/2009 |
| CN | 101931880 A | 12/2010 |
| CN | 101932102 A | 12/2010 |
| CN | 102484885 A | 5/2012 |
| CN | 102547848 A | 7/2012 |
| CN | 102869095 A | 1/2013 |
| JP | 2009522870 A | 6/2009 |
| JP | 2013502850 A | 1/2013 |
| RU | 2008131074 A | 2/2010 |
| WO | 2012098656 A1 | 7/2012 |
| WO | 2012137173 A2 | 10/2012 |
| WO | 2015135107 A1 | 9/2015 |

OTHER PUBLICATIONS

ITU-T G.709/Y.1331,Series G: Transmission Systems and Media, Digital Systems and Networks Digital terminal equipments—General Series Y: Global Information Infrastructure, Internet Protocol Aspects and Next-Generation Networks Internet protocol aspects—Transport, Interfaces for the optical transport network Amendment 2, Oct. 2013. total 14 pages.

* cited by examiner

DATA TRANSMISSION METHOD AND COMMUNICATIONS DEVICE

CROSS-REFERENCE TO RELATED APPLICATIONS

This application is a continuation of International Patent Application No. PCT/CN2015/073576, filed on Mar. 3, 2015, which claims priority to International Patent Application No. PCT/CN2014/073121, filed on Mar. 10, 2014, both of which are hereby incorporated by reference in their entireties.

TECHNICAL FIELD

The present invention relates to the field of communications technologies, and in particular, to a data transmission method and a communications device.

BACKGROUND

With development of wireless communication systems, single carrier frequency division multiple access (Single carrier frequency division multiple access, SC-FDMA) and orthogonal frequency division multiplexing (Orthogonal frequency division multiplexing, OFDM) are respectively used for uplink data transmission and downlink data transmission, so as to improve wireless spectrum efficiency. An OFDM system has a high requirement for frequency synchronization, and frequency offset and a phase noise have relatively high impact on performance of the OFDM system. Therefore, the OFDM system is not applicable to some occasions, and another multi-carrier modulation technology needs to be considered. In addition, with diversification of data services, different transmission requirements are raised. For example, in some machine type communications (Machine type communications, MTC) services, data is sent periodically, a data volume is small, and a machine-to-machine (Machine-To-Machine, M2M) terminal device generally has a relatively long service life; therefore, energy saving is a great challenge. To reduce signaling interworking to achieve an electricity saving effect, it is more applicable to use some physical layer transmission technologies whose requirements for synchronization are not very high, such as universal filtered multicarrier (Universal filtered multicarrier, UFMC), filter bank multicarrier (Filter bank multicarrier, FBMC), generalized frequency division multiplexing (Generalized frequency division multiplexing, GFDM), and bi-orthogonal frequency division multiplexing (Bi-orthogonal frequency division multiplexing, BFDM). In addition, these physical layer transmission technologies whose requirements for synchronization are not high can further reduce a requirement for transmission network synchronization and improve performance of coordinated transmission.

However, in existing data transmission, multiple types of service data of same user equipment are multiplexed at a media access control (Media access control, MAC) layer, and data flows are not distinguished at a physical (Physical, PHY) layer. Therefore, different physical layer transmission technologies cannot be chosen for multiple data flows of the same user equipment. Consequently, a spectrum resource cannot be fully used, and transmission efficiency is not high.

SUMMARY

In view of this, embodiments of the present invention provide a data transmission method and user equipment, so that different physical layer transmission technologies can be used for multiple data flows of same user equipment, a spectrum resource is fully used, and transmission efficiency is improved.

According to a first aspect, an embodiment of the present invention provides a communications device, where the communications device includes: a memory, a processor, and a communications interface; where the memory is configured to store mapping information between a data flow identifier and a physical layer transmission technology identifier, where the mapping information includes a correspondence between the data flow identifier and the physical layer transmission technology identifier; and the processor is configured to: determine a to-be-scheduled data flow; determine, from the mapping information and according to a data flow identifier of the data flow, a physical layer transmission technology identifier corresponding to the data flow; generate different transport blocks according to data flows corresponding to different physical layer transmission technology identifiers, where each physical layer transmission technology identifier is corresponding to one type of transport block; generate wireless communication data by performing processing, according to a physical layer transmission technology corresponding to the physical layer transmission technology identifier, on a transport block corresponding to the physical layer transmission technology identifier; and send the wireless communication data to a receive end by using the communications interface.

In a first possible implementation manner of the first aspect, when the communications device is a base station and the receive end is user equipment, the processor is further configured to: before the sending the wireless communication data to a receive end by using the communications interface, send, by using the communications interface, downlink scheduling information corresponding to the wireless communication data to the receive end, where the downlink scheduling information carries the physical layer transmission technology identifier corresponding to the wireless communication data, so that the receive end obtains the transport block by parsing the wireless communication data according to the physical layer transmission technology corresponding to the physical layer transmission technology identifier, so as to acquire the data flow.

With reference to the first possible implementation manner of the first aspect, in a second possible implementation manner, the processor is specifically configured to: separately perform processing, that is, scrambling, channel coding, and rate matching, on downlink scheduling information corresponding to multiple wireless communication data; generate a downlink scheduling information group by multiplexing all processed downlink scheduling information; and carry the downlink scheduling information group over a downlink control channel, and send the downlink scheduling information group to the receive end by using the communications interface.

With reference to the first possible implementation manner of the first aspect, in a third possible implementation manner, the processor is specifically configured to: generate a downlink scheduling information group by multiplexing downlink scheduling information corresponding to multiple wireless communication data; perform processing, that is, scrambling, channel coding, and rate matching, on the downlink scheduling information group; and carry processed downlink scheduling information group over a downlink control channel, and send the processed downlink scheduling information group to the receive end by using the communications interface.

In a fourth possible implementation manner of the first aspect, when the communications device is user equipment and the receive end is a base station, the processor is further configured to: before the determining a to-be-scheduled data flow, receive, by using the communications interface, uplink scheduling information sent by the receive end, where the uplink scheduling information carries time-frequency resource information corresponding to the physical layer transmission technology identifier; and the processor is specifically configured to: determine, according to the time-frequency resource information corresponding to the physical layer transmission technology identifier, a time-frequency resource corresponding to the physical layer transmission technology corresponding to the wireless communication data; and send the wireless communication data to the receive end by using the time-frequency resource, so that the receive end obtains the transport block by parsing the wireless communication data according to the physical layer transmission technology corresponding to the time-frequency resource used for the wireless communication data, so as to acquire the data flow.

With reference to the fourth possible implementation manner of the first aspect, in a fifth possible implementation manner, the uplink scheduling information further carries a correspondence between the data flow identifier and the physical layer transmission technology identifier; and the processor is further configured to: before the determining a to-be-scheduled data flow, update the mapping information according to the correspondence between the data flow identifier and the physical layer transmission technology identifier that is carried in the uplink scheduling information.

According to a second aspect, an embodiment of the present invention provides user equipment, where the user equipment includes: a processor and a communications interface; where the processor is configured to: receive, by using the communications interface, wireless communication data sent by a transmit end; determine a physical layer transmission technology corresponding to the wireless communication data; obtain, by parsing the wireless communication data according to the determined physical layer transmission technology, a transport block corresponding to the wireless communication data; and acquire a data flow included in the transport block corresponding to the wireless communication data.

In a first possible implementation manner of the second aspect, when the communications device is user equipment and the transmit end is a base station, the processor is further configured to: before the receiving, by using the communications interface, wireless communication data sent by a transmit end, receive downlink scheduling information that is corresponding to the wireless communication data and sent by the transmit end, where the downlink scheduling information carries a physical layer transmission technology identifier corresponding to the wireless communication data; where the processor is specifically configured to: determine, according to the physical layer transmission technology identifier, a physical layer transmission technology corresponding to the wireless communication data.

In a second possible implementation manner of the second aspect, when the communications device is a base station and the transmit end is user equipment, the processor is further configured to: before the receiving, by using the communications interface, wireless communication data sent by a transmit end, allocate different time-frequency resources for different physical layer transmission technologies; send uplink scheduling information to the transmit end by using the communications interface, where the uplink scheduling information carries time-frequency resource information corresponding to the physical layer transmission technology identifier, so that the transmit end determines a time-frequency resource corresponding to the physical layer transmission technology corresponding to the wireless communication data, and sends the wireless communication data to the communications device by using the determined time-frequency resource; where the processor is specifically configured to: determine, according to the time-frequency resource used for the wireless communication data, the physical layer transmission technology corresponding to the wireless communication data.

With reference to the second possible implementation manner of the second aspect, in a third possible implementation manner, the processor is further configured to: before the sending uplink scheduling information to the transmit end by using the communications interface, allocate a physical layer transmission technology for the data flow; where the uplink scheduling information further carries a correspondence between the data flow identifier and the physical layer transmission technology identifier, so that the transmit end updates, according to the correspondence between the data flow identifier and the physical layer transmission technology identifier that is carried in the uplink scheduling information, mapping information at the transmit end between a data flow identifier and a physical layer transmission technology identifier.

With reference to the second possible implementation manner of the second aspect or the third possible implementation manner of the second aspect, in a fourth possible implementation manner, the processor is specifically configured to: separately perform processing, that is, scrambling, channel coding, and rate matching, on multiple uplink scheduling information; generate an uplink scheduling information group by multiplexing all processed uplink scheduling information; and carry the uplink scheduling information group over a downlink control channel, and send the uplink scheduling information group to the transmit end by using the communications interface.

With reference to the second possible implementation manner of the second aspect or the third possible implementation manner of the second aspect, in a fifth possible implementation manner, the processor is specifically configured to: generate an uplink scheduling information group by multiplexing multiple uplink scheduling information; perform processing, that is, scrambling, channel coding, and rate matching, on the uplink scheduling information group; and carry the processed uplink scheduling information group over a downlink control channel, and send the uplink scheduling information group to the transmit end by using the communications interface.

According to a third aspect, an embodiment of the present invention provides a data transmission method, where mapping information between a data flow identifier and a physical layer transmission technology identifier is stored at a transmit end, the mapping information includes a correspondence between the data flow identifier and the physical layer transmission technology identifier, and the method includes:

determining, by the transmit end, a to-be-scheduled data flow; determining, by the transmit end, from the mapping information and according to a data flow identifier of the data flow, a physical layer transmission technology identifier corresponding to the data flow;

generating, by the transmit end, different transport blocks according to data flows corresponding to different physical layer transmission technology identifiers, so as to send the data flow to a receive end by using the transport block, where each physical layer transmission technology identifier is corresponding to one type of transport block;

generating, by the transmit end, wireless communication data by performing processing, according to a physical layer transmission technology corresponding to the physical layer transmission technology identifier, on the transport block corresponding to the physical layer transmission technology identifier; and sending, by the transmit end, the wireless communication data to the receive end.

In a first possible implementation manner of the third aspect, when the transmit end is a base station and the receive end is user equipment, before the sending, by the transmit end, the wireless communication data to the receive end, the method further includes: sending, by the transmit end, downlink scheduling information corresponding to the wireless communication data to the receive end, where the downlink scheduling information carries the physical layer transmission technology identifier corresponding to the wireless communication data, so that the receive end obtains the transport block by parsing the wireless communication data according to the physical layer transmission technology corresponding to the physical layer transmission technology identifier, so as to acquire the data flow.

With reference to the first possible implementation manner of the third aspect, in a second possible implementation manner, the sending, by the transmit end, downlink scheduling information corresponding to the wireless communication data to the receive end is specifically: separately performing, by the transmit end, processing, that is, scrambling, channel coding, and rate matching, on the downlink scheduling information corresponding to the multiple wireless communication data; generating, by the transmit end, a downlink scheduling information group by multiplexing all processed downlink scheduling information; and carrying, by the transmit end, the downlink scheduling information group over a downlink control channel, and sending the downlink scheduling information group to the receive end.

With reference to the first possible implementation manner of the third aspect, in a third possible implementation manner, the sending, by the transmit end, downlink scheduling information corresponding to the wireless communication data to the receive end is specifically: generating, by the transmit end, a downlink scheduling information group by multiplexing the downlink scheduling information corresponding to the multiple wireless communication data; performing, by the transmit end, processing, that is, scrambling, channel coding, and rate matching, on the downlink scheduling information group; and carrying, by the transmit end, processed downlink scheduling information group over a downlink control channel, and sending the processed downlink scheduling information group to the receive end.

In a fourth possible implementation manner of the third aspect, when the transmit end is user equipment and the receive end is a base station, before the determining, by the transmit end, a to-be-scheduled data flow, the method further includes: receiving, by the transmit end, uplink scheduling information sent by the receive end, where the uplink scheduling information carries time-frequency resource information corresponding to the physical layer transmission technology identifier; and the sending, by the transmit end, the wireless communication data to the receive end is specifically: determining, by the transmit end according to the time-frequency resource information corresponding to the physical layer transmission technology identifier, a time-frequency resource corresponding to the physical layer transmission technology corresponding to the wireless communication data; and sending, by the transmit end, the wireless communication data to the receive end by using the time-frequency resource, so that the receive end obtains the transport block by parsing the wireless communication data according to the physical layer transmission technology corresponding to the time-frequency resource used for the wireless communication data, so as to acquire the data flow.

With reference to the fourth possible implementation manner of the third aspect, in a fifth possible implementation manner, the uplink scheduling information further carries a correspondence between the data flow identifier and the physical layer transmission technology identifier; and before the determining, by the transmit end, a to-be-scheduled data flow, the method further includes: updating, by the transmit end, the mapping information according to the correspondence between the data flow identifier and the physical layer transmission technology identifier that is carried in the uplink scheduling information.

According to a fourth aspect, an embodiment of the present invention provides a data transmission method, where the method includes:

receiving, by a receive end, wireless communication data sent by a transmit end;

determining, by the receive end, a physical layer transmission technology corresponding to the wireless communication data;

obtaining, by the receive end by parsing the wireless communication data according to the determined physical layer transmission technology, a transport block corresponding to the wireless communication data; and acquiring, by the receive end, a data flow included in the transport block corresponding to the wireless communication data.

In a first possible implementation manner of the fourth aspect, when the receive end is user equipment and the transmit end is a base station, before the receiving, by a receive end, wireless communication data sent by a transmit end, the method further includes: receiving, by the receive end, downlink scheduling information that is corresponding to the wireless communication data and sent by the transmit end, where the downlink scheduling information carries a physical layer transmission technology identifier corresponding to the wireless communication data, and the determining, by the receive end, a physical layer transmission technology corresponding to the wireless communication data is specifically: determining, by the receive end according to the physical layer transmission technology identifier, a physical layer transmission technology corresponding to the wireless communication data.

In a second possible implementation manner of the fourth aspect, when the receive end is a base station and the transmit end is user equipment, before the receiving, by a receive end, wireless communication data sent by a transmit end, the method further includes: allocating, by the receive end, different time-frequency resources for different physical layer transmission technologies; and sending, by the receive end, uplink scheduling information to the transmit end, where the uplink scheduling information carries time-frequency resource information corresponding to the physical layer transmission technology identifier, so that the transmit end determines a time-frequency resource corresponding to the physical layer transmission technology corresponding to the wireless communication data and sends the wireless communication data to the communications device by using the determined time-frequency resource; where the determining, by the receive end, a physical layer transmission technology corresponding to the wireless communication data is specifically: determining, by the receive end according to the time-frequency resource used for the wireless communication data, the physical layer transmission technology corresponding to the wireless communication data.

With reference to the second possible implementation manner of the fourth aspect, in a third possible implementation manner, before the sending, by the receive end, uplink scheduling information to the transmit end, the method further includes: allocating, by the receive end, a physical layer transmission technology for the data flow, where the uplink scheduling information carries a correspondence between the data flow identifier and the physical layer transmission technology identifier, so that the transmit end updates, according to the correspondence between the data flow identifier and the physical layer transmission technology identifier that is carried in the uplink scheduling information, mapping information at the transmit end between a data flow identifier and a physical layer transmission technology identifier.

With reference to the second possible implementation manner of the fourth aspect or the third possible implementation manner of the fourth aspect, in a fourth possible implementation manner, the sending, by the receive end, uplink scheduling information to the transmit end is specifically: separately performing, by the receive end, processing, that is, scrambling, channel coding, and rate matching, on multiple uplink scheduling information; generating, by the receive end, an uplink scheduling information group by multiplexing all processed uplink scheduling information; and carrying, by the receive end, the uplink scheduling information group over a downlink control channel, and sending the uplink scheduling information group to the transmit end.

With reference to the second possible implementation manner of the fourth aspect or the third possible implementation manner of the fourth aspect, in a fifth possible implementation manner, the sending, by the receive end, uplink scheduling information to the transmit end is specifically: generating, by the receive end, an uplink scheduling information group by multiplexing multiple uplink scheduling information; performing, by the receive end, processing, that is, scrambling, channel coding, and rate matching, on the uplink scheduling information group; and carrying, by the receive end, processed uplink scheduling information group over a downlink control channel, and sending the uplink scheduling information group to the transmit end.

According to the foregoing solutions, a transmit end determines, from mapping information between a data flow identifier and a physical layer transmission technology identifier and according to an identifier of a data flow, a physical layer transmission technology corresponding to the data flow, generates different transport blocks according to data flows corresponding to different physical layer transmission technology identifiers, generates wireless communication data by performing processing, according to a physical layer transmission technology corresponding to the physical layer transmission technology identifier, on the transport block corresponding to the physical layer transmission technology identifier, and sends the wireless communication data to the receive end. It can be learned that, according to the foregoing solutions, different physical layer transmission technologies may be used for multiple data flows of same user equipment, so as to make full use of a spectrum resource, and improve transmission efficiency.

DESCRIPTION OF EMBODIMENTS

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
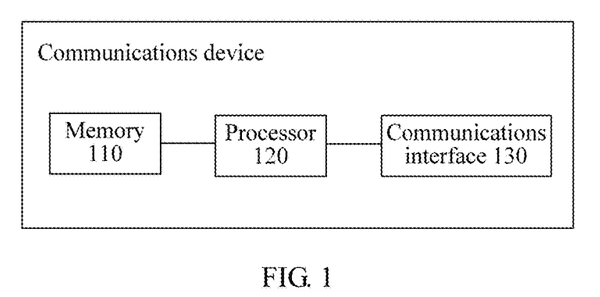
FIG. 1 is a schematic structural diagram of a communications device according to Embodiment 1 of the present invention.

The following uses FIG. 1 as an example to describe in detail a communications device according to Embodiment 1 of the present invention. As shown in FIG. 1, FIG. 1 is a schematic structural diagram of the communications device according to Embodiment 1 of the present invention. In this embodiment, the communications device is a transmit end device, and may be specifically: a base station (may also be referred to as an access point) or user equipment. When the communications device is the base station, a receive end is the user equipment; and when the communications device is the user equipment, the receive end is the base station.

The user equipment may be any terminal device such as a mobile device, a smartphone, an integrated messaging device (Integrated Messaging Device, IMD for short), a personal computer (Personal Computer, PC for short), a notebook computer, a personal digital assistant (Personal Digital Assistant, PDA for short), or a tablet computer. The user equipment may also be disposed on various traffic vehicles, or be disposed on a wearable device.

The communications device includes: a memory 110, a processor 120, and a communications interface 130.

The memory 110 is configured to store mapping information between a data flow identifier and a physical layer transmission technology identifier.

The mapping information includes a correspondence between the data flow identifier and the physical layer transmission technology identifier.

The data flow identifier may be specifically a logical channel identifier (Logical channel identifier, LCID) corresponding to a data flow, that is, an LCID at a media access control (Media Access Control, MAC for short) sublayer, a function entity number used at a Packet Data Convergence Protocol (Packet Data Convergence Protocol, PDCP for short) sublayer or a radio link control (Radio Link Control, RLC for short) sublayer when data flow is being implemented in the communications device, or a network transmission port number or a tunnel endpoint identifier that identifies a data flow when the data flow is being implemented in different communications devices. Physical layer transmission technologies include all technologies used in a physical layer data processing process: a waveform technology such as UFMC, FBMC, GFDM, BFDM, or OFDM; a coding technology such as Turbo code, Polar code, or LDPC code; a higher order modulation technology such as 128-QAM, 256-QAM, or 512-QAM; and a MIMO space modulation technology. No limitation is imposed in the present invention thereto. The physical layer transmission technology identifier may be one or a combination of identifiers of the foregoing physical layer transmission technologies.

The mapping information may be in a form shown in Table 1 or Table 2, or may be in another form, and no limitation is imposed in this embodiment of the present invention thereon.

TABLE 1

| Data flow identifier (LCID) | Physical layer transmission technology identifier | Physical layer transmission technology |
|---|---|---|
| 00001-01010 | 00000 | UFMC |
| 01011-01100 | 00001 | FBMC |
| 01101-10000 | 00010 | GFDM |
| 10001-11000 | 00011 | BFDM |
| 11001-11100 | 00100 | OFDM |
| . . . | . . . | . . . |

TABLE 2

| Data flow identifier (port number) | Physical layer transmission technology identifier | Physical layer transmission technology |
|---|---|---|
| 0xC000-0xCFFF | 00101 | Polar |
| 0xD000-0xDFFF | 00110 | Turbo |
| 0xE000-0xEFFF | 00111 | LDPC |
| . . . | . . . | . . . |

Figure 5:
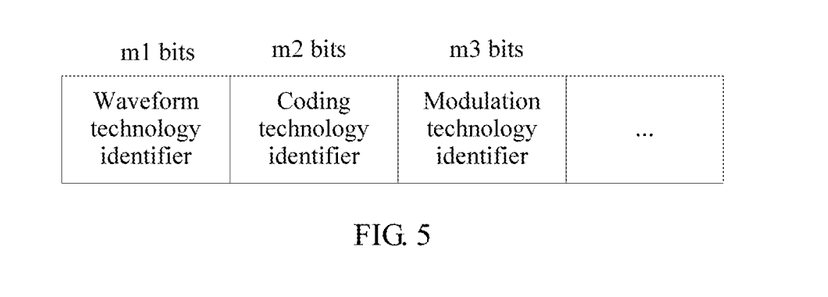
FIG. 5 is a simple schematic diagram of a physical layer transmission technology identifier according to an embodiment of the present invention.

The physical layer transmission technology may include various technologies of different sublayers; therefore, a mapping manner of a multi-level table shown in the Table 1 or Table 2 may be used for mapping between the physical layer transmission technology identifier and the data flow identifier. Each level of the table indicates a mapping relationship between a data flow and a technology of a corresponding sublayer. Layered identifying may be performed by combining various technologies and using a unified or combined physical layer transmission technology identifier. A method of the layered identifying is shown in FIG. 5, where m1 bits identifies a waveform technology, m2 bits identifies a coding technology, m3 bits identifies a modulation technology, and the like. An instance of a mapping table is shown in Table 3, where a physical layer transmission technology identifier is identified with five bits, higher-order two bits identify a waveform technology, and lower-order three bits identify a coding technology.

TABLE 3

| Data flow identifier (LCID) | Physical layer transmission technology identifier | Physical layer transmission technology |
|---|---|---|
| 00001-01010 | 00 000 | UFMC + Polar |
| 01011-01100 | 00 001 | UFMC + Turbo |
| 01101-10000 | 01 010 | GFDM + LDPC |
| 10001-11000 | 10 001 | OFMD + Turbo |
| . . . | . . . | . . . |

A processor 120 is configured to: determine a to-be-scheduled data flow; determine, from the mapping information and according to a data flow identifier of the to-be-scheduled data flow, a physical layer transmission technology identifier corresponding to the data flow; generate different transport blocks according to data flows corresponding to different physical layer transmission technology identifiers, where each physical layer transmission technology identifier is corresponding to one type of transport block; generate wireless communication data by performing processing, according to a physical layer transmission technology corresponding to the physical layer transmission technology identifier, on a transport block corresponding to the physical layer transmission technology identifier; and send the wireless communication data to a receive end by using a communications interface 130. A person skilled in the art may learn that the to-be-scheduled data flow may be determined at different transmission sublayers or for multiple sublayers, and in this specification, a MAC sublayer is used as an example for description in the following, which is not described in detail herein again.

In a specific example, the processor 120 controls the MAC sublayer to determine the to-be-scheduled data flow, determine, from the mapping information and according to a data flow identifier of the to-be-scheduled data flow, the physical layer transmission technology identifier corresponding to the data flow, generate, according to a data flow corresponding to a same physical layer transmission technology, a transport block of a same type, and generate different transport blocks according to the data flows corresponding to the different physical layer transmission technologies.

Figure 1A:
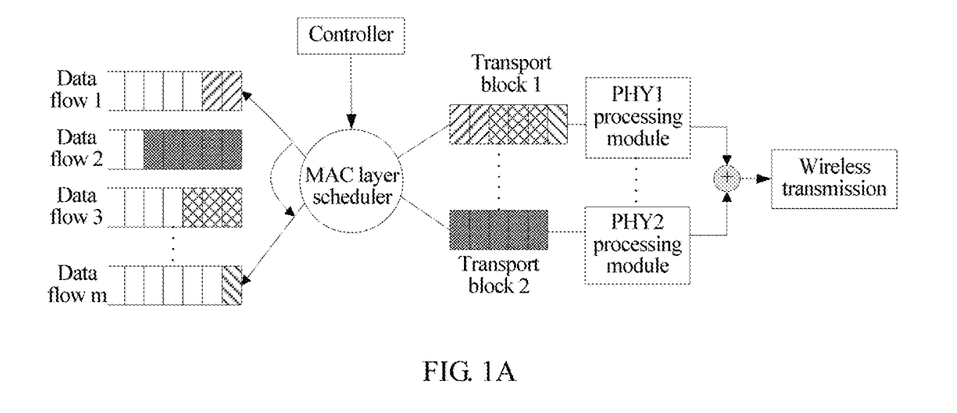
FIG. 1A is a schematic flowchart of generating a data transport block according to Embodiment 1 of the present invention.

Specifically, for different data flows corresponding to a same physical layer transmission technology, communications resources, such as a transport block, of the physical layer transmission technology may be multiplexed. For example, as shown in FIG. 1A, the processor 120 includes a controller, a MAC sublayer scheduler, and multiple processing modules at a PHY layer (different physical layer transmission technologies are corresponding to different processing modules). Data flows 1, 3, and m are corresponding to a same physical layer transmission technology identifier PHY1 and may be multiplexed to a time-frequency resource; the controller in the processor 120 controls the MAC sublayer scheduler to generate a transport block 1 according to the data flows 1, 3, and m. A data flow 2 is corresponding to a physical layer transmission technology identifier PHY2; the controller in the processor 120 controls the MAC sublayer scheduler to generate a transport block 2 according to the data flow 2. Then, a PHY1 processing module at the PHY layer in the processor 120 generates corresponding wireless communication data 1 by performing processing on the transport block 1 by using a physical layer transmission technology corresponding to the PHY1, and a PHY2 processing module at the PHY layer in the processor 120 generates corresponding wireless communication data 2 by performing processing on the transport block 2 by using a physical layer transmission technology corresponding to the PHY2.

Optionally, when the communications device is a base station and the receive end is user equipment, the processor 120 is further configured to: before sending wireless communication data to the receive end by using the communications interface 130, send downlink scheduling information corresponding to the wireless communication data to the receive end by using the communications interface 130, where the downlink scheduling information carries the physical layer transmission technology identifier corresponding to the wireless communication data, so that the receive end obtains the transport block by parsing the wireless communication data according to the physical layer transmission technology corresponding to the physical layer transmission technology identifier, so as to acquire the data flow.

Figure 1B:
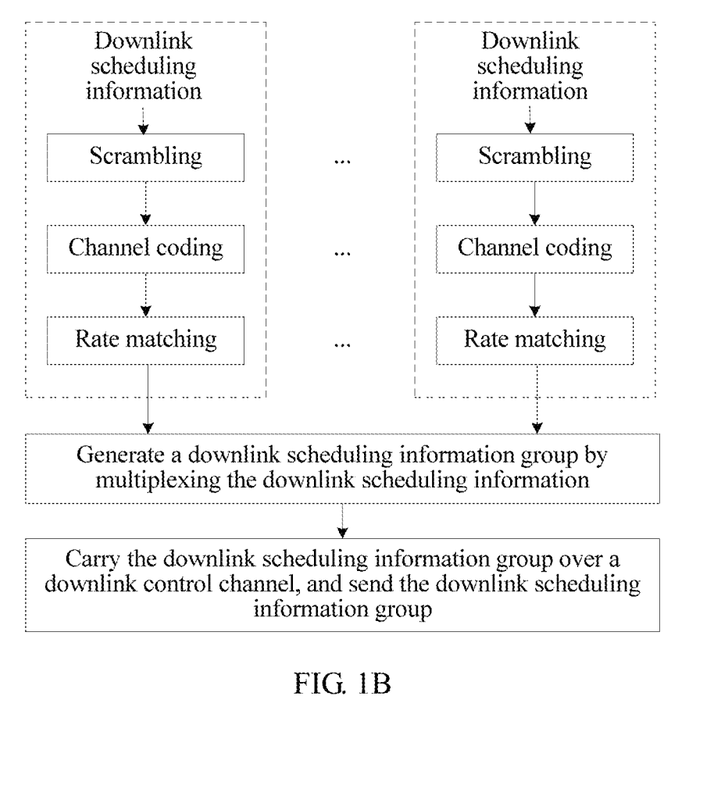
FIG. 1B is a schematic flowchart of sending downlink scheduling information according to Embodiment 1 of the present invention.
Figure 1C:
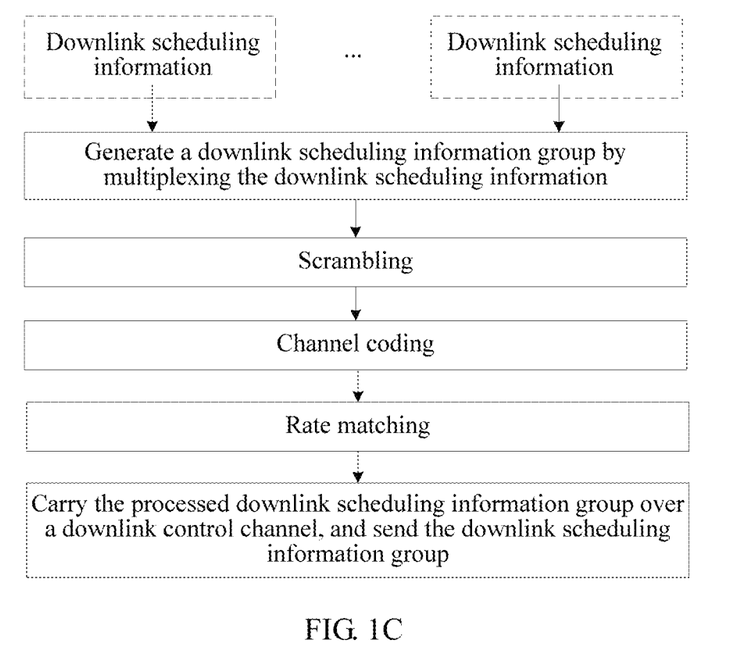
FIG. 1C is another schematic flowchart of sending downlink scheduling information according to Embodiment 1 of the present invention.

Specifically, as shown in FIG. 1B, the processor 120 separately performs processing, that is, scrambling, channel coding, and rate matching, on downlink scheduling information corresponding to multiple wireless communication data, multiplexes all processed downlink scheduling information to generate a downlink scheduling information group, carries the downlink scheduling information group over a downlink control channel, and sends the downlink scheduling information group to the receive end by using the communications interface 130; alternatively, as shown in FIG. 1C, the processor 120 multiplexes downlink scheduling information corresponding to the multiple wireless communication data to generate a downlink scheduling information group, performs processing, that is, scrambling, channel coding, and rate matching, on the downlink scheduling information group, carries processed downlink scheduling information group over a downlink control channel, and sends the processed downlink scheduling information group to the receive end by using the communications interface 130.

Optionally, when the communications device is user equipment and the receive end is a base station, the processor 120 is further configured to: before determining the to-be-scheduled data flow, receive, by using the communications interface 130, uplink scheduling information sent by the receive end, where the uplink scheduling information carries time-frequency resource information corresponding to the physical layer transmission technology identifier.

Then a specific process in which the processor 120 sends the wireless communication data is as follows:

determining, according to time-frequency resource information corresponding to the physical layer transmission technology identifier, a time-frequency resource that is corresponding to a physical layer transmission technology corresponding to the wireless communication data; sending the wireless communication data to the receive end by using the determined time-frequency resource, so that the receive end obtains the transport block by parsing the wireless communication data according to the physical layer transmission technology corresponding to the time-frequency resource used for the wireless communication data, so as to acquire the data flow.

In addition, the uplink scheduling information may further carry a correspondence between the data flow identifier and the physical layer transmission technology identifier. Before determining the to-be-scheduled data flow, the processor 120 may further configured to update, according to the correspondence between the data flow identifier and the physical layer transmission technology identifier that is carried in the uplink scheduling information, the mapping information between the data flow identifier and the physical layer transmission technology identifier that is stored in the memory 110.

By using the communications device provided in Embodiment 1 of the present invention, if the communications device is a base station, the base station may use different physical layer transmission technologies for multiple data flows of same user equipment, and if the communications device is user equipment, the user equipment may use the different physical layer transmission technologies for the multiple data flows, so that a spectrum resource is fully used and transmission efficiency is improved.

Figure 2:
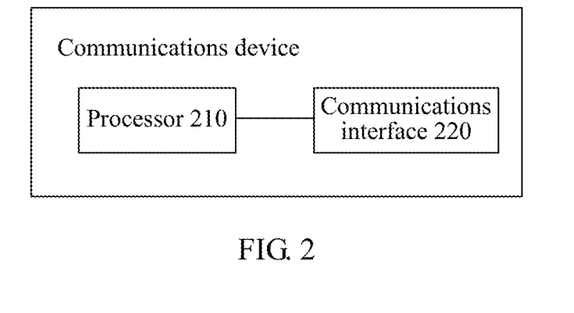
FIG. 2 is a schematic structural diagram of a communications device according to Embodiment 2 of the present invention.

The following uses FIG. 2 as an example to describe in detail a communications device according to Embodiment 2 of the present invention. As shown in FIG. 2, FIG. 2 is a schematic structural diagram of the communications device according to Embodiment 2 of the present invention. In this embodiment, the communications device is a receive end device, and may be specifically: a base station or user equipment. When the communications device is the base station, a transmit end is the user equipment; and when the communications device is the user equipment, the transmit end is the base station.

The communications device includes: a processor 210 and a communications interface 220.

The processor 210 is configured to: receive, by using the communications interface 220, wireless communication data sent by the transmit end; determine a physical layer transmission technology corresponding to the wireless communication data; obtain, by parsing the wireless communication data according to the determined physical layer transmission technology, a transport block corresponding to the wireless communication data; and acquire a data flow included in the transport block corresponding to the wireless communication data.

Optionally, when the communications device is user equipment, the transmit end is a base station, the processor 210 is further configured to: before receiving, by using the communications interface 220, the wireless communication data sent by the transmit end, receive, by using the communications interface 220, downlink scheduling information that is corresponding to the wireless communication data and sent by the transmit end, where the downlink scheduling information carries a physical layer transmission technology identifier corresponding to the wireless communication data.

Correspondingly, when the communications device is user equipment, a process in which the processor 210 determines the physical layer transmission technology corresponding to the wireless communication data is specifically:

determining, by the processor 210 according to the physical layer transmission technology identifier carried in the downlink scheduling information, the physical layer transmission technology corresponding to the wireless communication data.

Optionally, when the communications device is a base station, the transmit end is user equipment, the processor 210 is further configured to: before receiving, by using the communications interface 220, the wireless communication data sent by the transmit end, allocate different time-frequency resources for different physical layer transmission technologies; send uplink scheduling information to the transmit end by using the communications interface 220, where the uplink scheduling information carries time-frequency resource information corresponding to the physical layer transmission technology identifier, so that the transmit end determines a time-frequency resource corresponding to the physical layer transmission technology corresponding to the wireless communication data, and sends the wireless communication data to the communications device by using the determined time-frequency resource.

Correspondingly, when the communications device is a base station, a process in which the processor 210 determines the physical layer transmission technology corresponding to the wireless communication data is specifically:

determining, by the processor 210 according to the time-frequency resource used for the wireless communication data, the physical layer transmission technology corresponding to the wireless communication data.

Because the time-frequency resource is allocated by the base station, in a case in which the communications device is a base station, after receiving the wireless communication data, the base station may determine, according to the time-frequency resource used for the wireless communication data, the physical layer transmission technology used for the wireless communication data at the transmit end, and parse the wireless communication data according to the determined physical layer transmission technology.

In addition, the uplink scheduling information may further carry a correspondence between the data flow identifier and the physical layer transmission technology identifier. The processor 210 is further configured to: before sending the uplink scheduling information to the transmit end by using the communications interface 220, allocate a physical layer transmission technology for the data flow.

Specifically, all transmit ends store mapping information between the data flow identifier and the physical layer transmission technology identifier. The mapping information includes the correspondence between the data flow identifier and the physical layer transmission technology identifier. The data flow identifier may be specifically an LCID corresponding to the data flow. The physical layer transmission technology includes: UFMC, FBMC, GFDM, BFDM, OFDM, or the like. The mapping information may be in a form shown in FIG. 1, or may be in another form, and no limitation is imposed in this embodiment of the present invention thereon.

A process in which the processor 210 sends the uplink scheduling information to the transmit end by using the communications interface 220 may be specifically: separately performing, by the processor 210, processing, that is, scrambling, channel coding, and rate matching, on multiple uplink scheduling information, multiplexing all processed uplink scheduling information to generate an uplink scheduling information group, carrying the uplink scheduling information group over a downlink control channel, and sending the uplink scheduling information group to the transmit end by using the communications interface 220; alternatively, multiplexing, by the processor 210, multiple uplink scheduling information to generate an uplink scheduling information group, performing processing, that is, scrambling, channel coding, and rate matching, on the uplink scheduling information group, carrying processed uplink scheduling information group over a downlink control channel, and sending the processed uplink scheduling information group to the transmit end by using the communications interface 220.

By using the communications device provided in Embodiment 2 of the present invention, if the communications device is a base station, the base station may use different physical layer transmission technologies for multiple data flows of same user equipment, and if the communications device is user equipment, the user equipment may use the different physical layer transmission technologies for the multiple data flows, so that a spectrum resource is fully used and transmission efficiency is improved.

Figure 3:
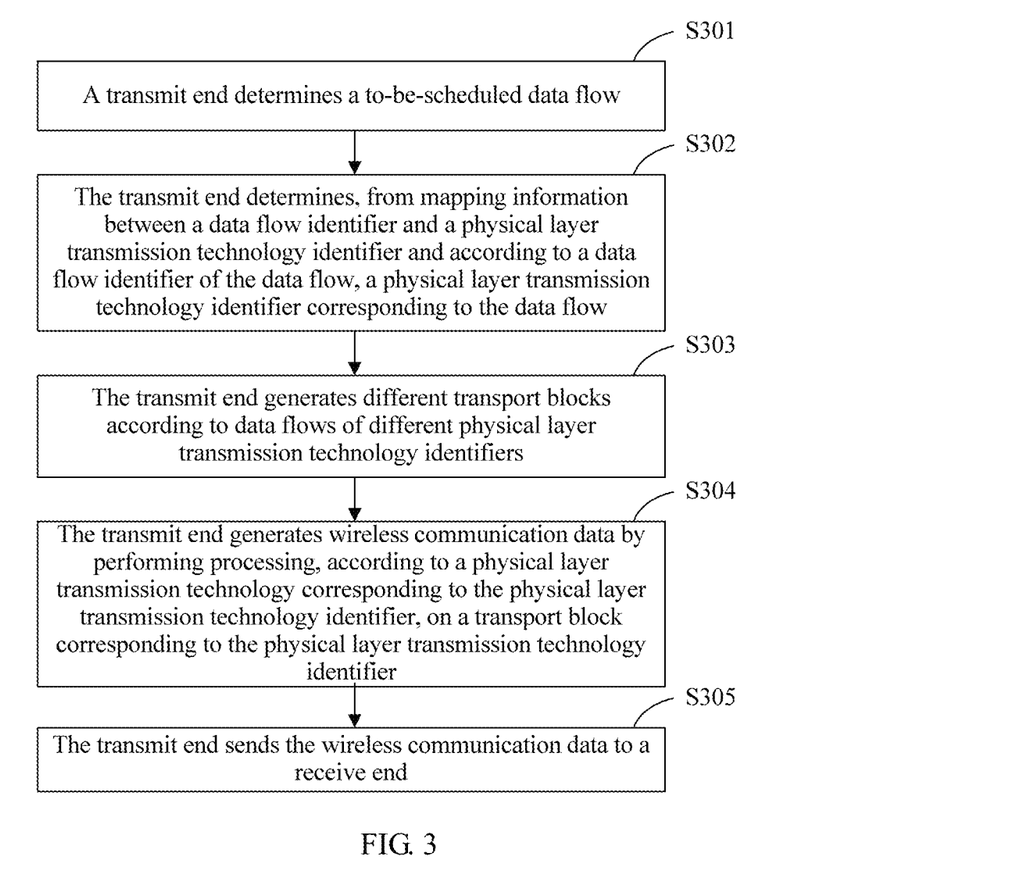
FIG. 3 is a schematic flowchart of a data transmission method according to Embodiment 3 of the present invention.

The following uses FIG. 3 as an example to describe in detail a data transmission method provided in Embodiment 3 of the present invention. As shown in FIG. 3, FIG. 3 is a schematic flowchart of a data transmission method according to Embodiment 3 of the present invention. The data transmission method is executed by a transmit end, where the transmit end may be specifically the communications device provided in Embodiment 1 of the present invention.

The data transmission method includes the following steps:

S301: The transmit end determines a to-be-scheduled data flow.

S302: The transmit end determines, from mapping information between a data flow identifier and a physical layer transmission technology identifier and according to a data flow identifier of the data flow, a physical layer transmission technology identifier corresponding to the data flow.

The mapping information between the data flow identifier and the physical layer transmission technology identifier is stored at the transmit end. The mapping information includes a correspondence between the data flow identifier and the physical layer transmission technology identifier.

The data flow identifier may be specifically a logical channel identifier LCID corresponding to the data flow. A physical layer transmission technology includes: UFMC, FBMC, GFDM, BFDM, OFDM, or the like.

The mapping information may be in a form shown in FIG. 1, or may be in another form, and no limitation is imposed in this embodiment of the present invention thereon.

S303: The transmit end generates different transport blocks according to data flows that are corresponding to different physical layer transmission technology identifiers, where each physical layer transmission technology identifier is corresponding to one type of transport block.

Specifically, a MAC sublayer of the transmit end determines the to-be-scheduled data flow, determines, from the mapping information and according to the data flow identifier of the to-be-scheduled data flow, the physical layer transmission technology identifier corresponding to the data flow, generates, according to a data flow corresponding to a same physical layer transmission technology, a transport block of a same type, and generates different transport blocks according to data flows corresponding to different physical layer transmission technologies.

S304: The transmit end generates wireless communication data by performing processing, according to a physical layer transmission technology corresponding to the physical layer transmission technology identifier, on a transport block corresponding to the physical layer transmission technology identifier.

Specifically, for different data flows corresponding to a same physical layer transmission technology, communications resources, such as a transport block, of the physical layer transmission technology may be multiplexed. For example, if data flows 1, 3, and m are corresponding to a same physical layer transmission technology identifier PHY1, the data flows 1, 3, and m may be multiplexed, and a transport block 1 is generated at the MAC sublayer of the transmit end according to the data flows 1, 3, and m; and if a data flow 2 is corresponding to a physical layer transmission technology identifier PHY2, a transport block 2 is generated at the MAC sublayer of the transmit end according to the data flow 2. Then, a PHY layer of the transmit end generates corresponding wireless communication data 1 by performing processing on the transport block 1 by using a physical layer transmission technology corresponding to a PHY1, and generates corresponding wireless communication data 2 by performing processing on the transport block 2 by using a physical layer transmission technology corresponding to a PHY2.

S305: The transmit end sends the wireless communication data to the receive end.

After receiving the wireless communication data, the receive end obtains the transport block by parsing the wireless communication data by using a physical layer transmission technology corresponding to the wireless communication data, and then acquires a data flow included in the transport block.

Optionally, when the transmit end is a base station and the receive end is user equipment, before S305, the method further includes:

sending, by the transmit end, downlink scheduling information corresponding to the wireless communication data to the receive end, where the downlink scheduling information carries the physical layer transmission technology identifier corresponding to the wireless communication data, so that the receive end obtains the transport block by parsing the wireless communication data according to the physical layer transmission technology corresponding to the physical layer transmission technology identifier, so as to acquire the data flow.

Specifically, the transmit end separately performs processing, that is, scrambling, channel coding, and rate matching, on downlink scheduling information corresponding to multiple wireless communication data, multiplexes all processed downlink scheduling information to generate a downlink scheduling information group, carries the downlink scheduling information group over a downlink control channel, and sends the downlink scheduling information group to the receive end; alternatively, multiplexes downlink scheduling information corresponding to multiple wireless communication data to generate a downlink scheduling information group, performs processing, that is, scrambling, channel coding, and rate matching, on the downlink scheduling information group, carries processed downlink scheduling information group over a downlink control channel, and sends the processed downlink scheduling information group to the receive end.

Optionally, when the transmit end is user equipment and the receive end is a base station, before S301, the method further includes:

receiving, by the transmit end, uplink scheduling information sent by the receive end, where the uplink scheduling information carries time-frequency resource information corresponding to the physical layer transmission technology identifier.

Then, S305 is specifically:

determining, according to time-frequency resource information corresponding to the physical layer transmission technology identifier, a time-frequency resource that is corresponding to a physical layer transmission technology corresponding to the wireless communication data; sending the wireless communication data to the receive end by using the determined time-frequency resource, so that the receive end obtains the transport block by parsing the wireless communication data according to the physical layer transmission technology corresponding to the time-frequency resource used for the wireless communication data, so as to acquire the data flow.

In addition, the uplink scheduling information may further carry a correspondence between the data flow identifier and the physical layer transmission technology identifier. Then, before S301, the method may further include: updating the mapping information according to the correspondence between the data flow identifier and the physical layer transmission technology identifier that is carried in the uplink scheduling information.

By using the data transmission method provided in Embodiment 3 of the present invention, if the transmit end is a base station, the base station may use different physical layer transmission technologies for multiple data flows of same user equipment, and if the transmit end is user equipment, the user equipment may use the different physical layer transmission technologies for the multiple data flows, so that a spectrum resource is fully used and transmission efficiency is improved.

Figure 4:
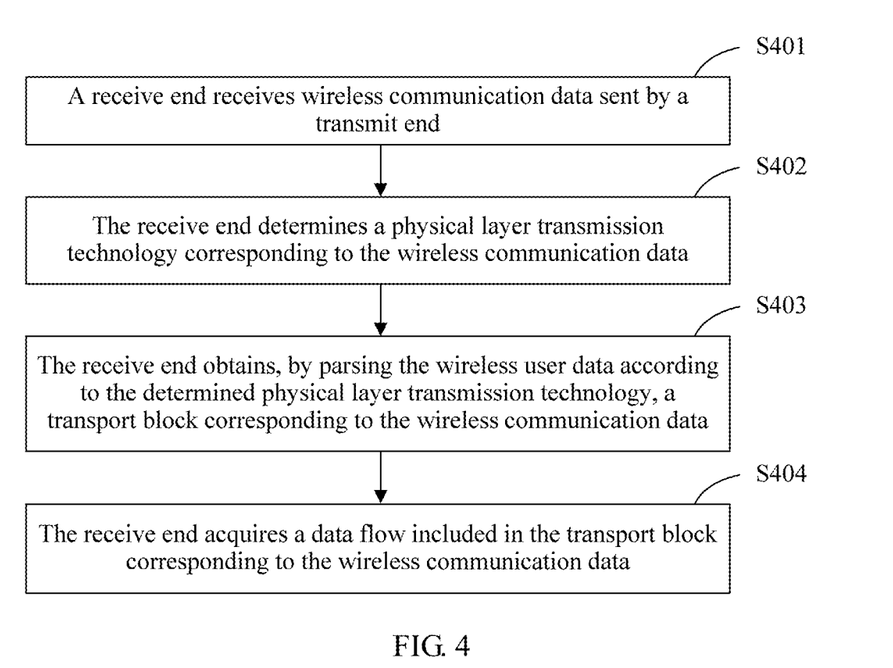
FIG. 4 is a schematic flowchart of a data transmission method according to Embodiment 4 of the present invention.

The following uses FIG. 4 as an example to describe in detail a data transmission method provided in Embodiment 4 of the present invention. As shown in FIG. 4, FIG. 4 is a schematic flowchart of a data transmission method according to Embodiment 4 of the present invention. The data transmission method is executed by a receive end, where the receive end may be specifically the communications device provided in Embodiment 2 of the present invention.

The data transmission method includes the following steps:

Step S401: The receive end receives wireless communication data sent by a transmit end.

Step S402: The receive end determines a physical layer transmission technology corresponding to the wireless communication data.

Optionally, when the receive end is user equipment and the transmit end is a base station, before step S401, the method further includes: receiving, by the receive end, downlink scheduling information that is corresponding to the wireless communication data and sent by the transmit end, where the downlink scheduling information carries the physical layer transmission technology identifier corresponding to the wireless communication data.

Correspondingly, step S402 is specifically:

determining, according to the physical layer transmission technology identifier carried in the downlink scheduling information, the physical layer transmission technology corresponding to the wireless communication data.

Optionally, when the receive end is a base station and the transmit end is user equipment, before step S401, the method further includes: allocating, by the receive end, different time-frequency resources for different physical layer transmission technologies; sending uplink scheduling information to the transmit end, where the uplink scheduling information carries time-frequency resource information corresponding to the physical layer transmission technology identifier, so that the transmit end determines a time-frequency resource corresponding to the physical layer transmission technology corresponding to the wireless communication data, and sends the wireless communication data to the receive end by using the determined time-frequency resource.

Correspondingly, step S402 is specifically:

determining, according to the time-frequency resource used for the wireless communication data, the physical layer transmission technology corresponding to the wireless communication data.

Because the time-frequency resource is allocated by the base station, in a case in which the receive end is a base station, after receiving the wireless communication data, the base station may determine, according to the time-frequency resource used for the wireless communication data, the physical layer transmission technology used for the wireless communication data at the transmit end.

In addition, the uplink scheduling information may further carry a correspondence between a data flow identifier and a physical layer transmission technology identifier. Then, before step S401, the method further includes: allocating a physical layer transmission technology for the data flow.

Specifically, all transmit ends store mapping information between the data flow identifier and the physical layer transmission technology identifier. The mapping information includes the correspondence between the data flow identifier and the physical layer transmission technology identifier. The data flow identifier may be specifically an LCID corresponding to the data flow. The physical layer transmission technology includes: UFMC, FBMC, GFDM, BFDM, OFDM, or the like. The mapping information may be in a form shown in FIG. 1, or may be in another form, and no limitation is imposed in this embodiment of the present invention thereon.

A process in which the receive end sends the uplink scheduling information to the transmit end may be specifically: separately performing, by the receive end, processing, that is, scrambling, channel coding, and rate matching, on multiple uplink scheduling information, multiplexing all processed uplink scheduling information to generate an uplink scheduling information group, carrying the uplink scheduling information group over a downlink control channel, and sending the uplink scheduling information group to the transmit end; alternatively, multiplexing, by the receive end, the multiple uplink scheduling information to generate an uplink scheduling information group, performing processing, that is, scrambling, channel coding, and rate matching, on the uplink scheduling information group, carrying processed uplink scheduling information group over a downlink control channel, and sending the processed uplink scheduling information group to the transmit end.

Step S403: The receive end obtains, by parsing the wireless communication data according to the determined physical layer transmission technology, a transport block corresponding to the wireless communication data.

A PHY layer of the receive end obtains, by parsing the wireless communication data according to the determined physical layer transmission technology, a transport block corresponding to the wireless communication data.

Step S404: The receive end acquires a data flow included in the transport block corresponding to the wireless communication data.

A MAC sublayer of the receive end acquires the data flow from the transport block obtained by parsing the wireless communication data.

By using the data transmission method provided in Embodiment 4 of the present invention, if the receive end is a base station, the base station may use different physical layer transmission technologies for multiple data flows of same user equipment, and if the receive end is user equipment, the user equipment may use the different physical layer transmission technologies for the multiple data flows, so that a spectrum resource is fully used and transmission efficiency is improved.

For each of the foregoing embodiments, specifically, the foregoing mapping information between the data flow identifier and the physical layer transmission technology identifier may be established by the base station. When the base station establishes an uplink data connection to the user equipment, the base station allocates a physical layer transmission technology for a data flow according to a service proportion of each cell, so as to establish the mapping information between the data flow identifier and the physical layer transmission technology identifier. After the mapping information has been established, the base station carries the mapping information in configuration information and delivers the configuration information to the user equipment that is connected to the base station.

Further, the base station may dynamically update the mapping information, and re-allocate the physical layer transmission technology for the data flow according to a change of the service proportion of each cell, so as to update the mapping information between the data flow identifier and the physical layer transmission technology identifier. After the mapping information is updated, the base station carries an updated correspondence between the data flow identifier and the physical layer transmission technology identifier in the uplink scheduling information and sends the uplink scheduling information to the user equipment, so that the user equipment updates the stored mapping information.

If the base station uses fixed mapping information instead of dynamically updating the mapping information, only one type of physical layer transmission technology can be used for a same data flow in a data flow transmission process, and a multiplexing manner cannot be changed. If the base station can dynamically update the mapping information, different physical layer transmission technologies can be used the same data flow, and correspondingly, the multiplexing manner may also change, so that a spectrum resource may be used more fully and transmission efficiency is improved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific embodiments, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A user equipment, comprising:
a memory configured to store computer instructions and mapping information between a data flow identifier and a physical layer transmission technology identifier, wherein the physical layer transmission technology identifier identifies at least one of a physical layer transmission technology comprising at least one of a waveform technology, a coding technology, a higher order modulation technology, or a space modulation technology;
a communications interface; and
a processor coupled to receive and execute the computer instructions to:
determine a to-be-scheduled data flow;
determine, according to the mapping information and a data flow identifier of the data flow, a physical layer transmission technology identifier corresponding to the data flow;
generate, according to the data flow, a transport block which is corresponding to the physical layer transmission technology identifier, wherein different physical layer transmission technology identifiers are corresponding to different transport blocks; generate wireless communication data by performing processing, according to a physical layer transmission technology corresponding to the physical layer transmission technology identifier, on the transport block corresponding to the physical layer transmission technology identifier; and
send the wireless communication data to the base station by using the communications interface.

2. The user equipment according to claim 1, wherein the processor is further configured to:
before the determining a to-be-scheduled data flow, receive, by using the communications interface, uplink scheduling information sent by the base station, wherein the uplink scheduling information carries time-frequency resource information corresponding to the physical layer transmission technology identifier;
determine, according to the time-frequency resource information corresponding to the physical layer transmission technology identifier, a time-frequency resource corresponding to the physical layer transmission technology corresponding to the wireless communication data; and
send the wireless communication data to the base station by using the time-frequency resource.

3. The user equipment according to claim 2, wherein the uplink scheduling information further carries a correspondence between the data flow identifier and the physical layer transmission technology identifier; and
the processor is further configured to:
before the determining a to-be-scheduled data flow, update the mapping information according to the correspondence between the data flow identifier and the physical layer transmission technology identifier that is carried in the uplink scheduling information.

4. The user equipment according to claim 1, wherein the data flow identifier is a logical channel identifier LCD at a media access control sublayer, a function entity number used at a Packet Data Convergence Protocol PDCP sublayer or a radio link control RLC sublayer, or a network transmission port number or a tunnel endpoint identifier that is used for identifying a data flow when the data flow is being implemented in the user equipment; and
the physical layer transmission technology identifier comprises one or any combination of: an identifier of a waveform technology, an identifier of a coding technology, an identifier of a higher order modulation technology, and an identifier of a space modulation technology.

5. A data transmission method by a user equipment, comprising:
receiving, from a base station, mapping information between a data flow identifier and a physical layer transmission technology identifier;
storing the mapping information, wherein the mapping information comprises:
a correspondence between the data flow identifier and the physical layer transmission technology identifier, wherein the physical layer transmission technology identifier identifies a physical layer transmission technology comprising at least one of a waveform technology, a coding technology, a higher order modulation technology, or a space modulation technology;
determining a to-be-scheduled data flow;
determining from the mapping information and according to a data flow identifier of the data flow, a physical layer transmission technology identifier corresponding to the data flow;
generating according to the data flow, a transport block which is corresponding to the physical layer transmission technology identifier, so as to send the data flow to the base station by using the transport block, wherein different physical layer transmission technology identifiers are corresponding to different types of transport blocks;
generating wireless communication data by performing processing, according to a physical layer transmission technology corresponding to the physical layer transmission technology identifier, on a transport block corresponding to the physical layer transmission technology identifier; and
sending the wireless communication data to the base station.

6. The method according to claim 5, wherein before the determining, by the user equipment, a to-be-scheduled data flow, the method further comprises:
receiving, by the user equipment, uplink scheduling information sent by the base station, wherein the uplink scheduling information carries time-frequency resource information corresponding to the physical layer transmission technology identifier;
determining, by the user equipment according to the time-frequency resource information corresponding to the physical layer transmission technology identifier, a time-frequency resource corresponding to the physical layer transmission technology corresponding to the wireless communication data; and
sending, by the user equipment, the wireless communication data to the base station by using the time-frequency resource.

7. The method according to claim 6, wherein the uplink scheduling information further carries a correspondence between the data flow identifier and the physical layer transmission technology identifier; and before the determining, by the user equipment, a to-be-scheduled data flow, the method further comprises:

updating, by the user equipment the mapping information according to the correspondence between the data flow identifier and the physical layer transmission technology identifier that is carried in the uplink scheduling information.

8. The base station according to claim 5, wherein the data flow identifier is a logical channel identifier LCD at a media access control sublayer, a function entity number used at a Packet Data Convergence Protocol PDCP sublayer or a radio link control RLC sublayer, or a network transmission port number or a tunnel endpoint identifier that is used for identifying a data flow when the data flow is being implemented in the user equipment; and the physical layer transmission technology identifier comprises one or any combination of: an identifier of a waveform technology, an identifier of a coding technology, an identifier of a higher order modulation technology, or an identifier of a space modulation technology.

* * * * *